United States Patent Office 3,536,800
Patented Oct. 27, 1970

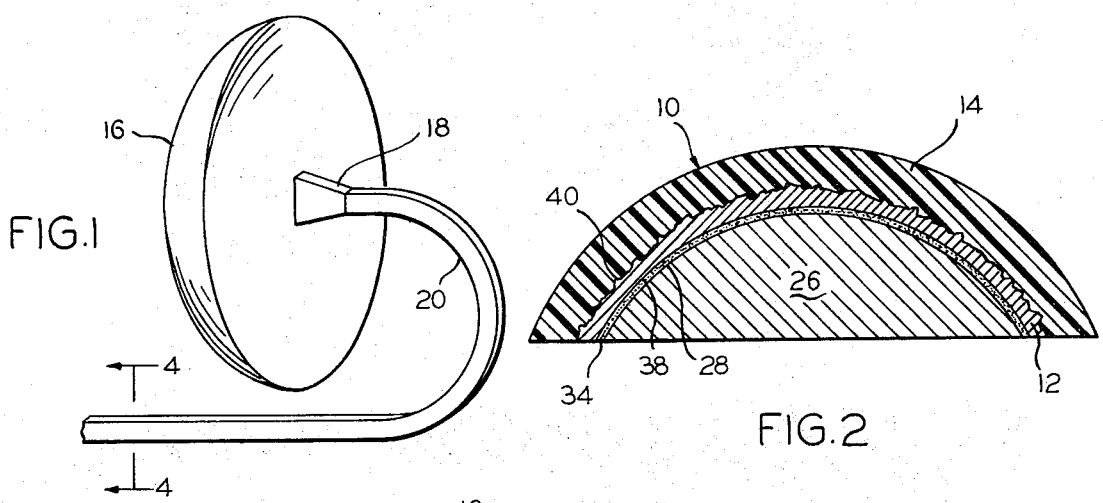
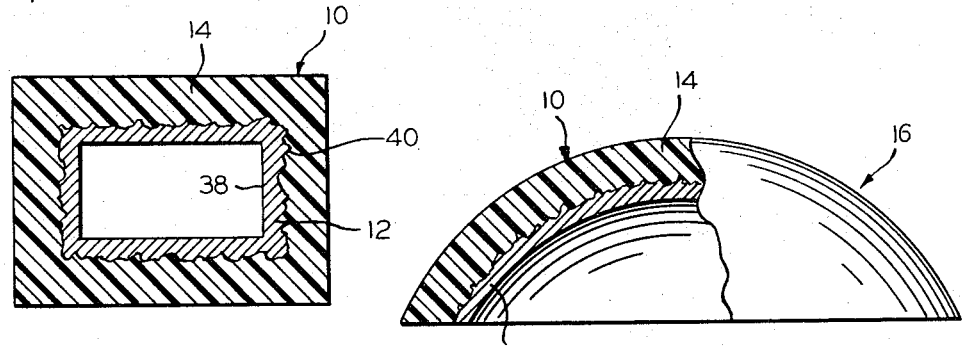
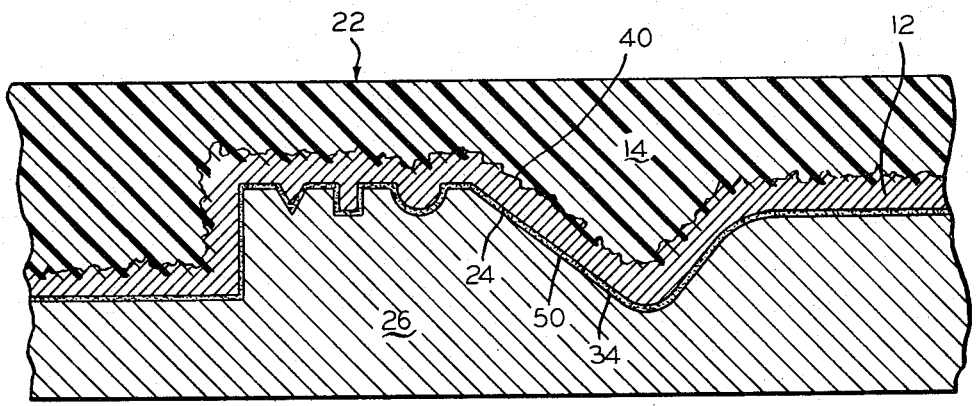

3,536,800
METHOD OF FORMING RADIO FREQUENCY DEVICES EMPLOYING A DESTRUCTIBLE MOLD
Howard H. Hubbard, Milan, Italy, assignor to Montecatini Edison Ellettronica S.p.A., Pomezia, Rome, Italy
Filed Feb. 25, 1966, Ser. No. 530,187
Int. Cl. H01q *15/14;* B29c *1/08*
U.S. Cl. 264—104
2 Claims

ABSTRACT OF THE DISCLOSURE

The invention herein described comprises an electrically conducting thin layer of metal whose active surface is shaped on a mold to precise requirements, the metal being substantially directly generated on the mold surface by spraying. The metal layer generated upon the mold surface is too thin to be self-supporting but is sufficiently thick so that a rough generally porous outer surface is provided to promote adherence of a support medium. After the metal layer has thus been sprayed, a self-supporting medium of plastic or any other suitable support material may be provided, the plastic adhering to the outer surface of the sprayed metal because of the coarse porous surface thereof. Thus, a precisely shaped relatively thin metal surface, which is normally not self-supporting, is carried by a means, mechanically strong enough to support the entire structure without distorting the metal surface after the metal and plastic have both been removed or separated from the mold. The separation between mold and metal may be accomplished by utilizing a thin skin-tight film or parting material created by applying a liquid layer over the mold surface so that the parting material conforms exactly to the mold surface and has a uniformly thin skin. The application of sprayed metal to the mold is effective to conform to every part of the mold surface to a high degree of accuracy. Another procedure for separating the mold from the sprayed metal relies upon removal or destruction of the mold by dissolving or melting the mold, the mold being thus made of suitable material susceptible to such treatment. The resulting construction provides a molded electrically conducting surface useful in connection with radio frequency devices such as radiator horns, wave guides and antennae.

---

This invention relates generally to radio frequency structures and the process for constructing the same, and more particularly relates to a metalized plastic material for radio frequency devices and the process of constructing the same. Still more particularly, the invention relates to a process to precisely form complex radio frequency conducting surfaces.

It has been a problem heretofore to precisely form the radio frequency conducting surface of many radio frequency devices in order to control the operation of these devices within strict electrical tolerances. A prior method used in forming radio frequency structures such as, for example, antennas, was a spinning technique whereby the mold and metal were rotated rapidly, and simultaneously mechanical presure was applied to the metal to form the proper curvature. Another prior method was to form the metal while stretching the same over a mold. The objection to these methods, was the tendency of the antenna structures after being formed to contract due to the resiliency in the metal. Consequently, it was extremely difficult and often impossible to control the antenna characteristics within narrow tolerances from the optimum calculated values. Hence, these methods were not suitable to form antennas or other radio frequency devices requiring a precise reproduction of the mold of the radio frequency conducting surface.

In the past, another problem of prime concern to design engineers was the weight of radio frequency devices, particularly the large diameter antennas. To reduce weight, antennas have been previously constructed from a composite material including both metal and plastic. A prior method used to form these type of antennas comprised the applying of a layer of plasticized material to a concave surface of a mold having a greater depth than the electrical conducting concave surface of the antenna. After forming the plasticized material, the same was metalized by spraying or painting molten metal thereon. These antennas weighed less than the completely metal antennas and also did not have the aforementioned tendency to contract since the metal surface was formed without straining large areas of the same. Although quite an improvement, these metalized plastic antennas, nevertheless, still had many objectionable features. For example, after the metal was applied to the plastic, it was necessary to machine or otherwise form the metal electrical conducting surface in order to derive the proper surface contour. To accurately accomplish this required a great deal of skill and time. Moreover, if the contour of the plastic was not formed properly, it was also an extremely difficult task, if possible at all, to compensate for this when applying or forming the metal surface. Furthermore, it was discovered that these prior metalized plastic antennas did not provide a secure and firm bond between the plastic and the metal film. Without the proper support of the plastic backing, the thin metal film would have the tendency to vibrate and even permanently distort. Either of these occurrences could result in a substantial reduction of efficiency or the complete inoperativeness of the antenna. Consequently, these antennas could not confidently be used even in a controlled environment wherein the strain on the antenna would be minimized.

A further objectionable feature of the prior processes for the forming of radio frequency devices was their inability to accurately fabricate those devices having extremely complex radio frequency conducting surfaces. Consequently, until the invention herein there were many instances when the user of high frequency devices, out of necessity, had to be satisfied with an operative performance which was substantially less than the design engineer's calculated optimum performance.

It is therefore a primary object of this invention to provide a process for accurately forming radio frequency devices that does not require a high degree of skill and involves substantially less time than was heretofore necessary.

Another primary object of this invention is to provide a process for accurately forming radio frequency devices whose electrical characteristics precisely conform to calculated design values.

Still another primary object is to provide a process for accurately forming a radio frequency device whose electrical conducting surface is substantially identical to the surface of a mold of the radio frequency conducting surface of the device. A related object is to provide a process for accurately forming an extremely complex radio frequency conducting surface to substantially the exact surface variations of the mold of such a complex radio frequency conducting surface.

Another object is to provide a process for accurately forming a radio frequency conducting surface without requiring additional shaping or contour forming after its removal from association with the mold of such radio frequency conducting surface.

Another object is to provide a process for forming radio frequency devices without subjecting the metal electrical conducting surface to stresses and strains, thereby preventing the possibility of resiliency in the metal causing uncontrollable distortion in the electrical conducting surface.

Still a further object is to provide a radio frequency device which minimizes weight without affecting performance or efficiency.

It is a primary feature to provide a radio frequency device having a film of metal formed with a smooth inner face which is substantially identical to the mold surface of the radio frequency conducting surface of the device, and a coarse and porous outer face to enable a secure bond to be made with a plastic layer placed thereover.

Another primary feature is to spray fine particles of molten metal against a mold surface in order to reproduce even the most minute details of the same.

For the purpose of facilitating an understanding of my invention, I have illustrated in the accompanying drawings, preferred embodiments thereof, from an inspection of which, when considered in connection with the following description, my invention, its mode of construction, assembly and operation and many of its advantages and features should be understood and appreciated.

Referring to the drawing in which the same characters of reference are used to indicate corresponding or similar parts throughout the several figures of the drawings:

FIG. 1 is a perspective view of a radio frequency reflector antenna, a feed horn and wave guide, each fabricated in accordance with the principles of the invention herein;

FIG. 2 is a enlarged cross-sectional view of the layers of material applied over the mold of the concave surface of the reflector in FIG. 1 in order to form the same;

FIG. 3 is an enlarged view of the reflector in FIG. 1, partly in cross-section;

FIG. 4 is an enlarged cross-sectional view of the wave guide in FIG. 1; and

FIG. 5 is a fragmentary cross-sectional view similar to FIG. 2, but illustrating an example of a radio frequency device having a complex radio frequency conducting surface.

Referring more particularly to the various figures of the drawing, the reference numeral 10 indicates generally a composite material embodying the principles of the invention. As shown in FIGS. 2 to 5, composite material 10 comprises a thin metal layer or film 12 and a substantially thicker plastic support layer 14. When combining the plastic layer 14 with the metal film 12, the same may be fabricated to form the radio frequency reflector antenna 16, feed horn 18 and wave guide 20 in FIG. 1, or a radio frequency device having an extremely complex radio frequency conducting surface. FIG. 5 illustrates an example of a radio frequency device indicated by numeral 22, having a highly complex radio frequency conducting surface 24.

Turning now particularly to FIG. 2, the novel process will be described in conjunction with the forming of the composite material 10 into the radio frequency reflector 16. A mold 26 is initially constructed to have an outer surface which has the exact contour of the radio frequency conducting surface of the reflector 16. Hence, the convex outer surface 28 of mold 26 corresponds substantially exactly to the concave radio frequency conducting surface of the reflector 16. To insure a precise reproduction of mold surface 28, the same should be extremely smooth.

Preferably a coating of a parting agent 34 is applied over the outer mold surface 28. The parting agent 34 flows evenly over the mold surface 38 and imparts only an extremely thin coat thereon to cause substantially no variations in the contour of the mold surface 28. Hence, if the mold surface were not extremely smooth, the parting agent could cause some distortion of the surface. Moreover, the parting agent after applied must present a tough and non-penetrable surface to molten metal.

The film of metal 12 is formed over the parting agent 34 in a manner to produce a smooth metal inner face 38 which is a precise reproduction of the contour of the mold surface 28 (see FIGS. 2 to 5). The outer metal face 40 of the metal film 12 is extremely rough and porous, to enable a secure bond to be made with the supporting plastic layer 14. A preferred means for applying the metal to the mold is by spraying fine particles of molten metal on the mold outer surface 28 until there is a sufficient build up of metal to form a predetermined width of the metal film 12. The beating of the fine particles of the sprayed molten metal against the extremely smooth mold surface 28 reproduces precisely the identical tracing of the mold surface on the inner metal face 38 of the metal film 12. Since the outer face 40 of the metal film has the least contact with other particles, it is consequently coarse and porous. In order to maintain the weight of the radio frequency device to a minimum, the thickness of the metal film is made as thin as safely possible.

The layer of plastic 14 is applied on the coarse porous outer metal face 40 of the metal film 12. The plastic is preferably applied when in a liquid state whereby it readily flows throughout the coarse surface of the outer metal face 40 and impregnates the pores thereof. Hence, upon hardening, a secure bond is effected between the plastic layer 14 and the metal film 12. Therefore, the bond between the plastic and coarse metal face safeguards the high frequency device from severance even within a very small area of contact. The plastic layer 14 is formed to a preselected thickness which affords adequate mechanical support for a predetermined set of conditions. Thus, if the radio frequency device were to be located inside an enclosure, the metal film 12 would require substantially less support than if the radio frequency device were directly exposed to the outside elements.

After the plastic layer 14 has been formed to provide support and a secure bond with the metal film 12 and also an eye pleasing outer appearance, the metalized plastic material 10 is removed from the mold. In order to prevent the possibility of strain or pressure damaging the metal inner face 38, the parting agent 34 is chosen so that the severing of metalized plastic material 10 from the outer mold surface 28 occurs at the interface between the parting agent and the outer mold surface instead of the interface between the parting agent and the metal inner face. After severance of the plasticized metal 10 from the mold, the parting agent 34 is removed from the inner metal face 38 and the same is ready for use as the concave radio frequency receiving surface for the reflector 16. No additional shaping or forming of the radio frequency conducting surface is necessary as was heretofore required.

For certain radio frequency conducting surfaces, the use of a disposable mold which is soluble or melts at a low temperature, is advised. When these type of molds are used, a parting agent would not be necessary.

The same aforedescribed process is also applicable to precisely reproduce an extremely complex mold surface, even to the most minute detail. As seen in FIG. 5, the process herein permits the complex radio frequency conducting surface 24 for the example radio frequency device 22, to be formed having substantially the exact surface variations as the complex mold surface 50. Therefore, by executing the aforementioned steps, namely: the construction of a mold having a highly smooth outer surface corresponding precisely to the radio frequency conducting surface of the radio frequency device to be fabricated; coating the outer mold surface with a parting agent; applying a metal layer or film to the coated mold surface to provide a smooth inner face capable of exactly reproducing the outer mold surface and a coarse outer face; and applying a plastic layer to the coarse outer metal face to make a secure bond therewith. Hence, by the steps of the process, radio frequency devices are easily fabricated irrespective whether such devices have radio frequency conducting surfaces of slight surface variations as the concave surface of reflector 16, or numerous surface variations as the extremely complex radio frequency conducting surface 24 of the example complex radio frequency device 22.

The mold 26 may be made in one or more pieces. If the radio frequency structure to be fabricated does not have too many bends or surface irregularities and is of a convenient size for handling or transporting, the mold may be made in one piece. Hence, if the converse is the case, and the radio frequency structure is complex or very large, it is often desirable to have the mold made in several pieces, and subsequently assembled together either at the fabricating plant or at the site where the structure is to be installed.

Molds 26 may be constructed from wood, cement, metal and plastics. The disposable type molds may be made from soluble plaster, soluble plastics or low temperature melting alloys. When the molds are for permanent use these materials are often specially treated to prevent warping or distortion over long periods of time. Lacquers or special finishes are applied to wood, cement or plastic to give smoothness and luster to the surface. To further enhance the luster, several coats of wax may be applied to the mold surface and then thoroughly buffed. The metal type molds are chrome or nickel plated to also improve their surface smoothness, and in addition serve to prevent corrosion. An extremely smooth surface is essential for the precise reproduction of the mold surface variations by the smooth metal inner face.

A parting agent which has been successfully used is a polyvinyl alcohol made by E. I. du Pont de Nemours, Wilmington, Del. A parting agent of this type may be applied with an air spray in a finely atomized mist, is highly "self-leveling," and dries in a short time. When dry, the polyvinyl alcohol produces a very tough continuous film. Under normal condition, this film is approximately .0001 inch in thickness. When the formed piece is removed from the mold, the parting takes place at the interface between the polyvinyl alcohol and the polished outer surface of the mold. Hence, this minimizes the strain on the inner face of the metal film. The polyvinyl alcohol being water soluble, is removed from the finished radio frequency device with warm water.

The plastic layer 14 provides the mechanical support for the thin metal film 12. Plastic layer 14 may be a pure plastic or reinforced plastic. Additionally it can be either a single monolithic layer or a sandwich arrangement using various types of core materials. Although thermoplastics could be used for specific cases, thermoset plastics which include fiberglass would normally be used to support metal films. Depending upon the mechanical requirements for the radio frequency device, other materials than fiberglass may be suitable as a reinforcement. These include asbestos, cotton or synthetic fibers, metal powder etc. For most applications of the invention herein, thermoset plastics made of epoxy and polyester resins and reinforced with fiberglass would provide the proper metal support. These resins with fiberglass reinforcements could be applied to the metal film by normal fabrication methods such as heating, match-die molding, hand lay up, spray up, vacuum or pressure molding, etc. The quantity and size of the piece being produced will determine the most economical system for fabrication.

From the foregoing description, it should be apparent that a novel metalized plastic material has been provided which is particularly suitable for use in fabricating high frequency devices. Moreover, the process described herein provides in a simple manner, the means for precisely reproducing radio frequency conducting surfaces of slight structural variation or radio frequency conducting surfaces of complex structural variations. Moreover, by spraying fine particles of molten metal against the mold surface corresponding to the radio frequency conducting surface of the radio frequency device to be fabricated, a film of metal is formed having a smooth inner face and a coarse outer face. The smooth inner face is a substantially precise reproduction of the mold surface. The coarse outer face permits a secure bond to be made with the plastic layer placed thereover. Hence, with the method of the invention herein, a complex radio frequency conducting surface could be accurately reproduced within tolerances which were heretofore virtually impossible to achieve.

It is believed that my invention, its mode of constrution and assembly, and many of its advantages should be readily understood from the foregoing without further description, and it should also be manifest that while a preferred embodiment of the invention has been shown and described for illustrative purposes, the structural details are nevertheless capable of wide variation within the purview of my invention as defined in the appended claims.

What I claim and desire to secure by Letter Patent of the United States is:

1. A method of making a device for operation with radio frequency fields, said method comprising providing a mold whose surface conforms to the theoretically desired electrically effective surface of the portion of the device for operation on said radio frequency fields, said mold being of a material whose normally-solid state may be changed to a different state without damage to a layer deposited on said surface, spraying an electrically-conductive metal directly over said mold surface to provide a smooth metallic surface to conform exactly to the mold contours, building up said metal surface with the same electrically conductive metal to provide an outer, generally-porous rough metal outer face too thin to be self-supporting, applying a coating of suitable plastic material over the roughened outer metal surface of said metal as a supporting backing, destroying said mold to enable said metal surface to be separated therefrom, thereby to leave a generally self-supporting structure having a smooth, electrically-conducting metallic surface accurately shaped for efficient use with electric waves of radio frequencies.

2. The method according to claim 1 wherein the mold material is soluble in solvents to which the metal layer is inert.

References Cited
UNITED STATES PATENTS 3,395,059  7/1968  Butler et al. _____ 264—104

ELI LIEBERMAN, Primary Examiner

U.S. Cl. X.R.

264—255, 317, 338; 343—912